(12) United States Patent
Mauer et al.

(10) Patent No.: US 7,475,468 B2
(45) Date of Patent: *Jan. 13, 2009

(54) METHOD OF OPERATING A RIVET MACHINE

(75) Inventors: Dieter Mauer, Lollar (DE); Reinhold Opper, Alten-Buseck (DE); Joachim Möser, Ulrichstein-Bobenhausen (DE)

(73) Assignee: Newfrey LLC, Newark, DE (US)

( * ) Notice: Subject to any disclaimer, the term of this patent is extended or adjusted under 35 U.S.C. 154(b) by 56 days.

This patent is subject to a terminal disclaimer.

(21) Appl. No.: 11/225,644

(22) Filed: Sep. 13, 2005

(65) Prior Publication Data

US 2006/0059678 A1    Mar. 23, 2006

Related U.S. Application Data

(63) Continuation of application No. 09/187,358, filed on Nov. 6, 1998, now Pat. No. 6,968,939.

(30) Foreign Application Priority Data

Nov. 6, 1997   (DE) ................................ 297 19 744

(51) Int. Cl.
    *B21J 15/02* (2006.01)
(52) U.S. Cl. ................................. 29/525.06
(58) Field of Classification Search .............. 29/525.06, 29/407.05, 407.08, 432.1, 716, 798, 243.53, 29/243.54; 227/119
    See application file for complete search history.

(56) References Cited

U.S. PATENT DOCUMENTS

| | | | |
|---|---|---|---|
| 601,941 A | 4/1898 | Brock | 227/119 |
| 1,022,481 A | 4/1912 | Holbrook | 227/119 |
| 1,203,554 A | 10/1916 | Brackett | 227/119 |
| 1,542,586 A | 6/1925 | Rubin et al. | 227/119 |
| 2,171,029 A | 8/1939 | Geldhof | 227/119 |
| 2,319,348 A | 5/1943 | Richards et al. | 227/119 |
| 2,878,954 A | 3/1959 | Troske | 227/119 |
| 2,897,644 A | 8/1959 | Willis et al. | 227/119 |
| 3,442,430 A | 5/1969 | Ackerman et al. | 227/119 |
| 3,964,661 A | 6/1976 | Schmidt et al. | 227/119 |
| 4,354,588 A | 10/1982 | Wolfertz | 227/119 |
| 4,463,888 A | 8/1984 | Geist et al. | 227/119 |

(Continued)

FOREIGN PATENT DOCUMENTS

DE    2403904    8/1974

(Continued)

*Primary Examiner*—John C Hong
(74) *Attorney, Agent, or Firm*—Harness, Dickey & Pierce, P.L.C.

(57) ABSTRACT

The invention relates to a conveyor for elongate components (12) designed with a head and a shank. The conveyor comprises a feed arrangement (7). The feed arrangement (7) comprises a transfer arrangement (8) with a transfer region (15) in which a component (12) can be positioned. In the transfer region (15), a feed duct (11) having a head guiding duct (13) and a shank guiding duct (14) passes into a conveying duct (16). The transfer arrangement (8) comprises at least one catch unit (17). The catch unit (17) comprises at least one catch element (18). The catch element (18) is arranged opposite the head guiding duct (13) and penetrates at least partially therein. It can be deflected from the head guiding duct (13) against a spring force.

33 Claims, 6 Drawing Sheets

U.S. PATENT DOCUMENTS

| | | | |
|---|---|---|---|
| 4,799,611 A | 1/1989 | Taga | 227/119 |
| 5,181,315 A | 1/1993 | Goodsmith | 227/119 |
| 5,192,012 A | 3/1993 | Schafer et al. | 227/113 |
| 5,305,940 A | 4/1994 | Gerhardt et al. | 228/4.1 |
| 5,476,204 A | 12/1995 | Eisenpresser et al. | 227/18 |
| 5,579,975 A | 12/1996 | Moorman | 227/119 |
| 5,588,576 A | 12/1996 | Knetsch | 227/119 |
| 5,779,127 A | 7/1998 | Blacket et al. | 227/107 |
| 5,808,264 A | 9/1998 | Stepetic et al. | 219/98 |
| 5,810,239 A | 9/1998 | Stich | 227/119 |
| 5,813,114 A | 9/1998 | Blacket et al. | 227/119 |
| 5,897,045 A | 4/1999 | Olvera et al. | 227/119 |
| 5,897,046 A | 4/1999 | Oehri et al. | 227/119 |
| 5,906,041 A | 5/1999 | Ito et al. | 227/135 |
| 5,964,393 A | 10/1999 | Feldpausch et al. | 227/135 |
| 6,276,050 B1 * | 8/2001 | Mauer et al. | 29/716 |
| 6,362,448 B1 | 3/2002 | Roser | 219/99 |

FOREIGN PATENT DOCUMENTS

| | | |
|---|---|---|
| DE | 19543900 | 5/1997 |
| EP | 0064364 | 11/1982 |
| EP | 0387430 | 3/1989 |
| EP | 0567240 | 10/1993 |
| GB | 2206828 | 1/1989 |
| WO | WO 95/34391 | 12/1995 |

* cited by examiner

METHOD OF OPERATING A RIVET MACHINE

CROSS-REFERENCE TO RELATED APPLICATIONS

This application is a continuation of U.S. patent application Ser. No. 09/187,358 filed Nov. 6, 1998 now U.S. Pat. No. 6,968,939 which claims priority to German Serial No. 29719744.4 filed Nov. 6, 1997, both of which are incorporated by reference herein.

BACKGROUND OF THE INVENTION

The invention relates to a conveyor for elongate components designed with a head and a shank, in particular rivets, screws, weld studs and the like.

It is known to use conveyors for the automated supply of elongate components designed with a head and a shank. These conveyors are used, in particular, for stud welding devices, punch riveting devices or the like.

German Patent No. 2 403 904 discloses a conveyor for elongate components designed with a head and a shank. The conveyor comprises a feed duct which passes into a conveying duct. Inside the conveying duct is arranged a plunger by means of which the component can be conveyed within the conveying duct to a free end portion of the conveying duct. The plunger can be pulled back sufficiently far within the conveying duct that it clears the feed duct. According to German Patent No. 2 403 904, the conveying duct extends such that the components pass into the conveying duct while utilizing the force of gravity. The components are introduced into the feed duct separately. Owing to the design of the conveyor according to German Patent No. 2 403 904, the cycle time of the conveyor is determined substantially by the feed rate of the components within the feed duct. To improve the cycle times it is known to increase the feed rate of the components. If the feed rate is increased, however, there is a risk that the components to be fed will jam or tilt within the feed duct.

To solve this problem, for example, U.S. Pat. No. 5,588,576 proposes a feed arrangement comprising gripping tongs with at least two gripping arms provided with a front gripping region and a rear pivot axis region. The gripping arms are spring loaded and have a portion through which the feed duct to the gripping region of the gripping arms taper. Owing to this design of the feed arrangement, the components which are fed individually at high speed, preferably pneumatically, are initially decelerated and then come to a standstill in the gripping region.

A problem with this feed arrangement which operates quite satisfactorily is that when components with identical geometry but of different materials are exchanged, the deceleration effect of the gripping tongs is too great, so the components do not pass to the transfer region. With components having a very great mass (great weight), it can happen that the deceleration effect is too slight so the component jumps out of the transfer region. During the feeding of components in a feed conduit, the speed of the component is reduced owing to frictional losses between the component and the feed duct. In particular with relatively long feed conduits, it may happen that the component does not reach the transfer region. It may also happen that the kinetic energy of the component is too low to spread the gripping tongs. To prevent this, the components are conveyed into the feed duct at high speed.

SUMMARY OF THE INVENTION

On the basis of the foregoing, the object of the present invention is to develop the known conveyor such that it can be used for elongate components of different materials designed with a head and a shank. The conveyor according to the invention for elongate components designed with a head and a shank has a feed arrangement comprising a transfer arrangement. By means of the transfer arrangement, a component is positioned in a transfer region in which the feed duct comprising a head guiding duct and a shank guiding duct passes into a conveying duct. The transfer arrangement comprises a catching unit comprising at least one catching element, which is arranged opposite the shank guiding duct and penetrates at least partially into the head guiding duct, in particular a catching pawl which can be deflected from the head guiding duct against a spring force.

This design of the conveyor according to the invention ensures that components with a relatively small mass (weight) also pass to the transfer region. The components which are guided in the feed duct, for example by means of compressed air, slide with their head in the head guiding duct and their shank in the shank guiding duct. If the component passes into the region of the catching unit, the head of the component acts on the catch element so the catch element is pressed from the head guiding duct and thus clears the head guiding duct. The catch element as such can be, for example, plate- or strip-shaped in design so it has only a small mass or spring rigidity enabling components having a relatively small mass to pass to the transfer region.

Since the catch element acts on the head of the component, the component can reliably pass into the transfer region as the catch element produces no or only slight moments round an axis extending transversely to the longitudinal axis of the component. This also prevents tumbling of the component during the feed process.

The conveyor according to the invention can be used in stationary tool devices such as robots. It can also be used in manually operated devices such as robots. It can also be used in manually operated devices such as manually operated stud welding devices. To ensure that the component does not leave the transfer region during the handling of a tool with the conveyor according to the invention, as might be possible, for example, during overhead work, it is proposed that at least one catch element have a locking face at least partially limiting the transfer region. This measure ensures that the components which passes to the transfer region cannot unintentionally slip from it. With the design of the conveyor according to the invention, a component can also be conveyed to the transfer region at a relatively slow speed because the component, in contrast to the state of the art, is not decelerated or is decelerated only to a limited extent by the catch element.

According to a further advantageous development of the conveyor, it is proposed that at least one catch element is articulated on one side. The catch element has a free portion which penetrates at least into the head guiding duct. This development allows a constructional embodiment of the catch unit in which the expenditure is low. The catch element can be, for example, tongue-shaped in design.

According to a further advantageous design of the conveyor, it is proposed that at least one catch element has a least one portion consisting of a resilient material. The deflection of the catch element from the head guiding duct can be influenced by appropriate choice of the resilient material. The resilient material is preferably a spring steel. Instead of a catch element made of a spring steel, the catch element can consist at least in part of a plastics material. In particular, the portion of the catch element forming the locking face consists of a resilient material so an impact by the component can be absorbed. A deceleration effect of the catch element can be achieved or varied by appropriate choice of the resilient material and of the geometry of the catch element.

According to a further advantageous design of the conveyor, it is proposed that at least one catch element be pivotal around an axis. At least one spring element acts on the catch element. The spring element can be, for example, a torsion spring which simultaneously forms the axis on which the catch element is articulated. To increase the availability of the conveyor, it is proposed that the spring element be a compression spring which is arranged between the axis and the end portion of the catch element. During a breakage of a winding of the compression spring, the operability, although restricted, is maintained so the desired aim of this development, an increase in the availability of the conveyor, is achieved To enable the component to adopt a defined position or location in the transfer region, it is proposed according to a further advantageous design of the conveyor that the transfer arrangement have two relatively displaceable positioning segments, the positioning segments defining a recess through which a component can be brought into the conveying duct. The positioning segments are displaceable relative to one another such that, when the positioning segments are moved away from one another, the recess widens so that a component can pass through this recess into the conveying duct. The positioning segments are pressed apart by the head of the component. The component can be, for example, T-shaped in design. The component is preferably so designed that the diameter of the head corresponds substantially to the length of the shank. The design of the conveyor according to the invention also prevents a component from jamming within the transfer arrangement. The conveyor therefore operates without disturbance.

The positioning segments preferably have a form corresponding substantially to the cross section of the feed duct. They simultaneously form an end portion of the feed duct. The positioning segments are displaceable substantially transversely to the longitudinal direction of the conveying duct. The positioning segments are preferably forcibly guided. The conveyor can have suitable guide means for this purpose, which cooperate with the positioning segments. The guide can be embodied, for example, by a tongue and groove guide. Other guides are also feasible. The positioning segments are preferably displaceable against a spring force. This measure ensures that, after a component has been introduced through the recess into a conveying duct, the positioning segments are returned by the spring force into their starting position in which the positioning segments receive a component in the transfer region.

To ensure that, during conveyance of the components in the conveying duct to an aperture of the conveying duct, the components do not change their location, it is proposed according to a further design of the conveyor that the conveying duct be formed by a split sleeve. The split sleeve has a first end portion adjacent to the transfer region and a second end portion remote from the transfer region. The cross section of the conveying duct tapers conically substantially from the first end portion to the second end portion. At least one resilient element is arranged at the second end portion of the conveying duct, which also comprises an aperture through which the component can issue from the conveying duct.

During transportation of a component from the first end portion or from the transfer region to the second end portion, the sleeve is enlarged by the component in the conveying duct against the action of at least one resilient element. Once the component has left the sleeve or the conveying duct, the sleeve is compressed by at least one resilient element. Further details and advantages of the design of the conveyor according to the invention will be described with reference to a preferred embodiment illustrated in the drawings.

BRIEF DESCRIPTION OF THE DRAWINGS

In the accompanying drawings.

DETAILED DESCRIPTION OF THE INVENTION

Figure 1:
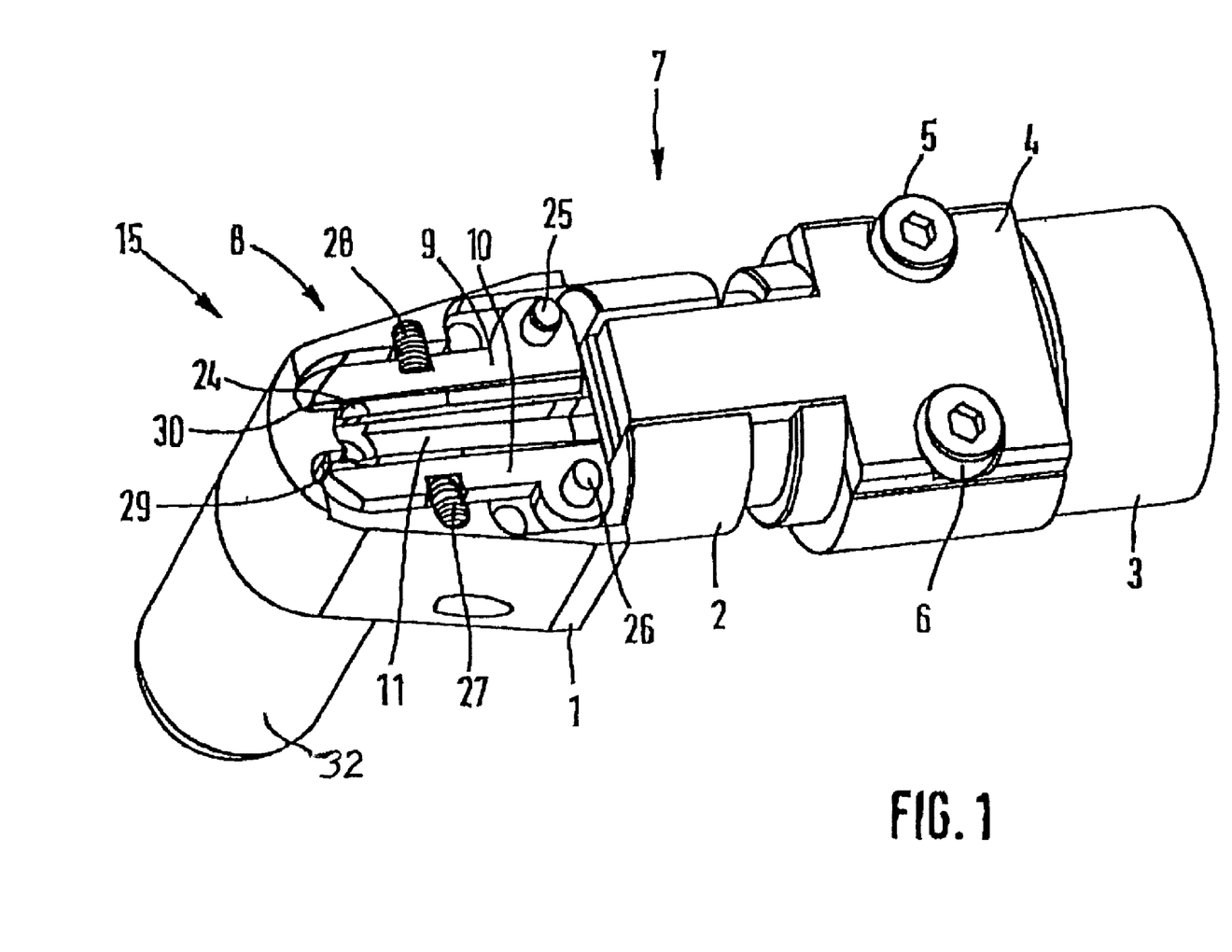
FIG. 1 is a perspective view of a conveyor.

FIG. 1 shows, in part, a conveyor for elongate components designed with a head and a shank. The conveyor comprised a casing 1. The casing 1 comprises a connecting piece 2 by means of which the casing 1 can be connected to a feed conduit 3. For fixing the feed conduit 3 on the casing 1 there is provided a connecting member 4 which is connected to the casing 1 or the connecting piece 2 by screws 5 and 6.

The conveyor comprises a feed arrangement 7 having a transfer arrangement 8. The transfer arrangement 8 comprises two positioning segments 9, 10. The positioning segments 9, 10 partially limit a feed duct 11 which is continued in the connecting piece 2 and the feed conduit 3

Figure 2:
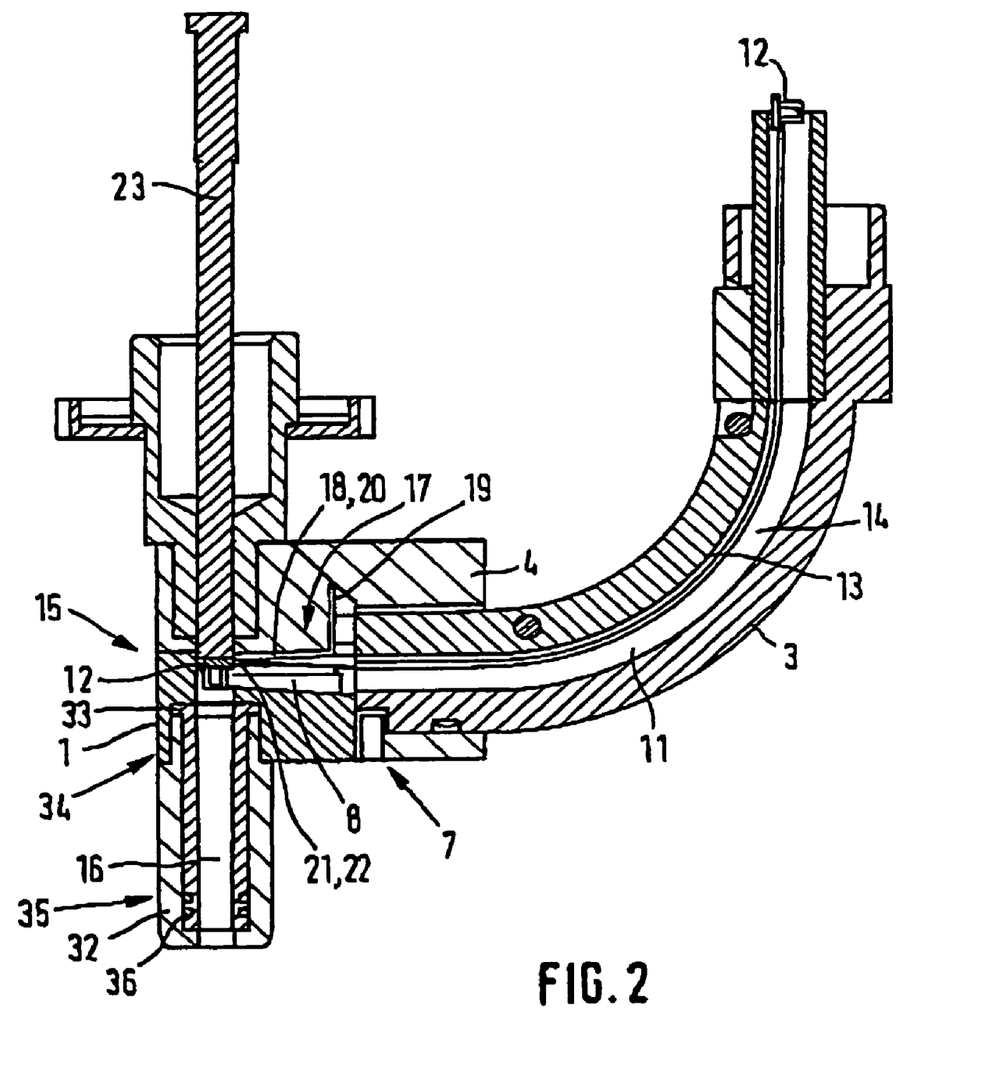
FIG. 2 is a solid section of a conveyor.

The remainder of a conveyor is described with reference to the embodiment illustrated in FIG. 2. The conveyor is proposed for elongate components 12 designed with a head and a shank. The components 12 can be fed to the conveyor via the feed conduit 3. The feed conduit 3 comprises the feed duct 11 which includes a head guiding duct 13 and a shank guiding duct 14. The conveyor comprises a feed arrangement 7 comprising a transfer arrangement 8 which is formed in a transfer region 15 in which the feed duct 11 passes into a conveying duct 16. A component 12 is shown in the transfer region 15 in the embodiment shown in FIG. 2.

The transfer arrangement 8 comprises a catch unit 17. The catch unit 17 comprises a catch element 18 which is arranged opposite the shank guiding duct 14 and penetrates at least partially into the head guiding duct 13. The catch element 18 can be deflected from the head guiding duct 13 against a spring force. The catch element 18 is L-shaped in design in FIG. 2. One arm 19 of the catch element 18 is fixed on the connecting member 4. The catch element 18 is therefore articulated on one side. The other arm 20 of the catch element 18 which penetrates at least partially into the head guiding duct 13 has a free end portion 21. The end portion 21 has a locking face 22 by means of which the transfer region 15 is at least partially limited. The catch element 18 preferably consists of a resilient material. As shown in FIG. 2, the locking face 22 rests on a head of the component 12 in the transfer region 15 so the component 12 is positioned in the transfer region.

A plunger 23, which can be brought to rest on the head of the component 12 so that the plunger pushes the component 12 into the conveying duct 16, is provided for conveying the component 12 from the transfer region 15 into the conveying longitudinal direction of the conveying duct 16. The plunger 23 can be pushed back so a further component can be introduced into the conveying duct 16. The plunger 23 can be, for example, an actuating tool by means of which, for example, a self-punching rivet or the like can be driven into the workpieces to be connected.

Figure 3:
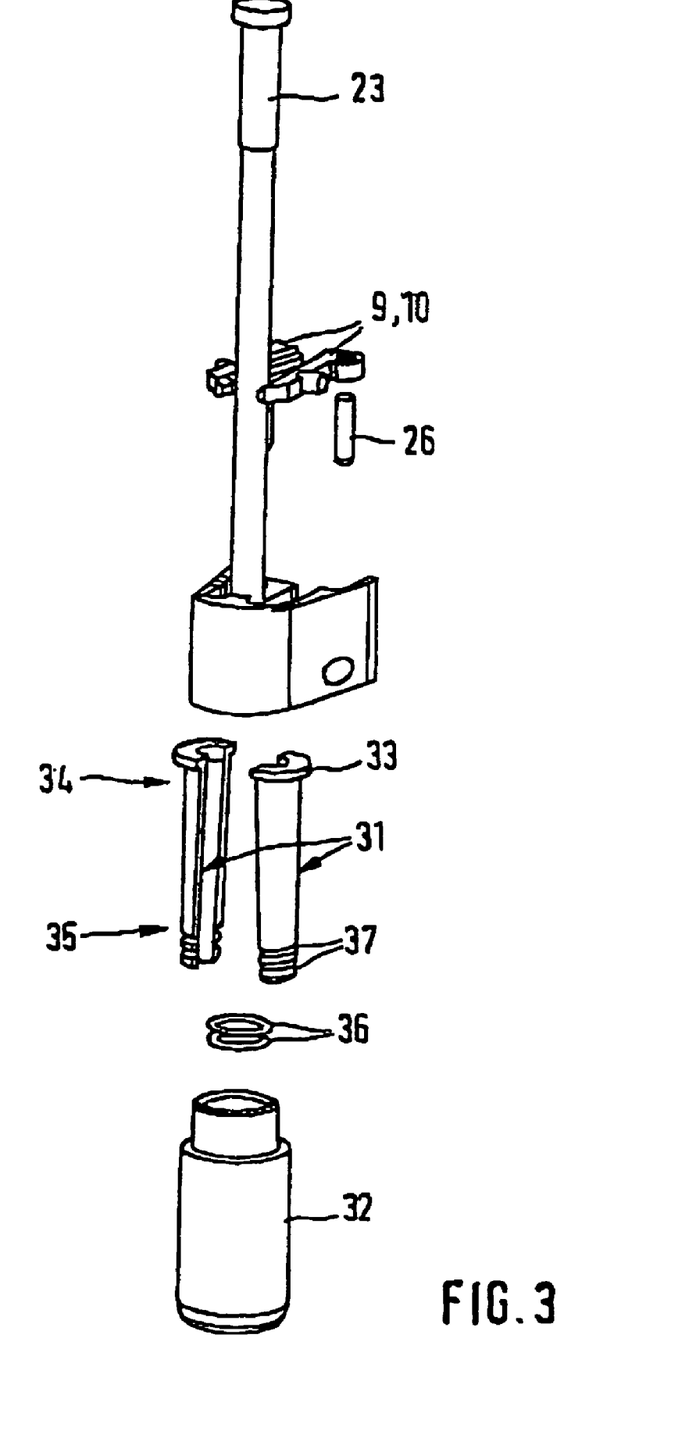
FIG. 3 is an exploded view of a part of the conveyor according to FIGS. 1 and 2.

The mode of operation of the device is described hereinafter with reference to FIGS. 1, 2 and 3. A component 12 which comprises a head and a shank is conveyed pneumatically in the feed conduit 3, which comprises a feed duct 11, to the feed arrangement 7. The head of the component 12 comes to rest on the catch element 18 which penetrates partially into the head guiding duct 13 of the feed duct 11. The component 12 presses the catch element 18 from the head guiding duct 13, the component 12 being slightly decelerated. It passes into the transfer region 15 at reduced speed. A transfer arrangement 8 which comprises two relatively displaceable positioning segments 9, 10 is provided in the transfer region 15. The positioning segments 9, 10 are so designed that they form a portion of the feed duct 11. The positioning segments 9, 10 limit a recess 24 through which the component 12 can be introduced into the conveying duct 16. Each positioning segment 9, 10 is pivotal around a respective pivot axis 25, 26. Each positioning segment 9, 10 is pivotal against a respective spring force of spring 27, 28. FIG. 1 shows that the free end portions of the positioning segments 9, 10 which rest opposite the pivot axis 25, 26 rest on stop faces 29, 30 formed in the casing so the respective spring 27, 28 does not press the respective positioning segment 9, 10 into the duct cross section of the feed duct 11.

If the component presses into the transfer region 15, the component 12 can be conveyed from the transfer region 15 by the plunger 23 in the conveying duct 16. The conveying duct 16 is formed by a split sleeve 31. The split sleeve 31 is arranged in a casing sleeve 32. The casing sleeve 32 is connected to the casing 1. The casing sleeve 32 is preferably connected to the casing 1 by a screw connection. For fixing the split sleeve 31, the split sleeve 31 has a flange 33 which is introduced between an end face of the casing sleeve 32 and the casing 1. The split sleeve 31 has a first end portion 34 adjacent to the transfer region 15 and a second end portion 35 remote from the transfer region 15. Two resilient elements 36 which are introduced into corresponding grooves 37 in the split sleeve 31 are arranged on the second end portion 35. The cross section of the conveying duct 16 tapers substantially from the first end portion 34 to the second end portion 35.

Figure 5:
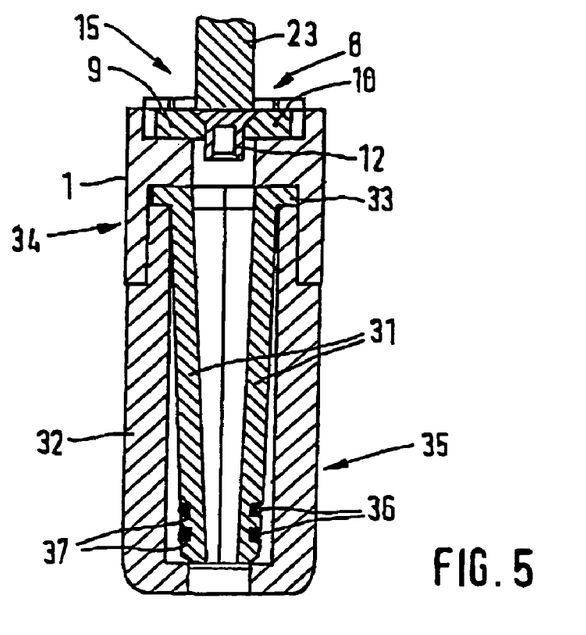
FIG. 5 is a magnified view of a conveying duct of the conveyor with a component in the transfer region.
Figure 6:
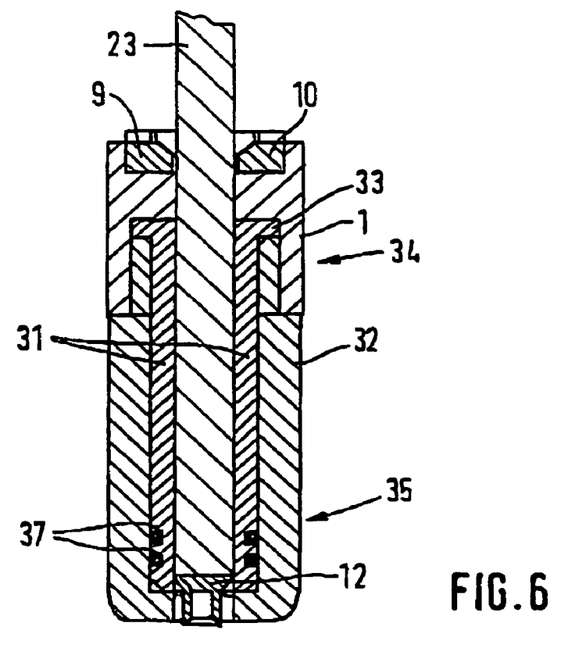
FIG. 6 shows the conveyor according to FIG. 5 with a component in the aperture region of the conveying duct.

If the component 12 is introduced by the plunger 23 into the conveying duct 16 and is conveyed therein to the second end portion 35, the cross section of the conveying duct 16 is enlarged by the component 12 against the action of the elastic elements 36. This design of the conveying duct ensures that the component 12 invariably adopts a predetermined location within the conveying duct. The above-described procedure can be seen, in particular, from FIGS. 5 and 6 which show snapshots of the feeding of a component 12.

Figure 4:
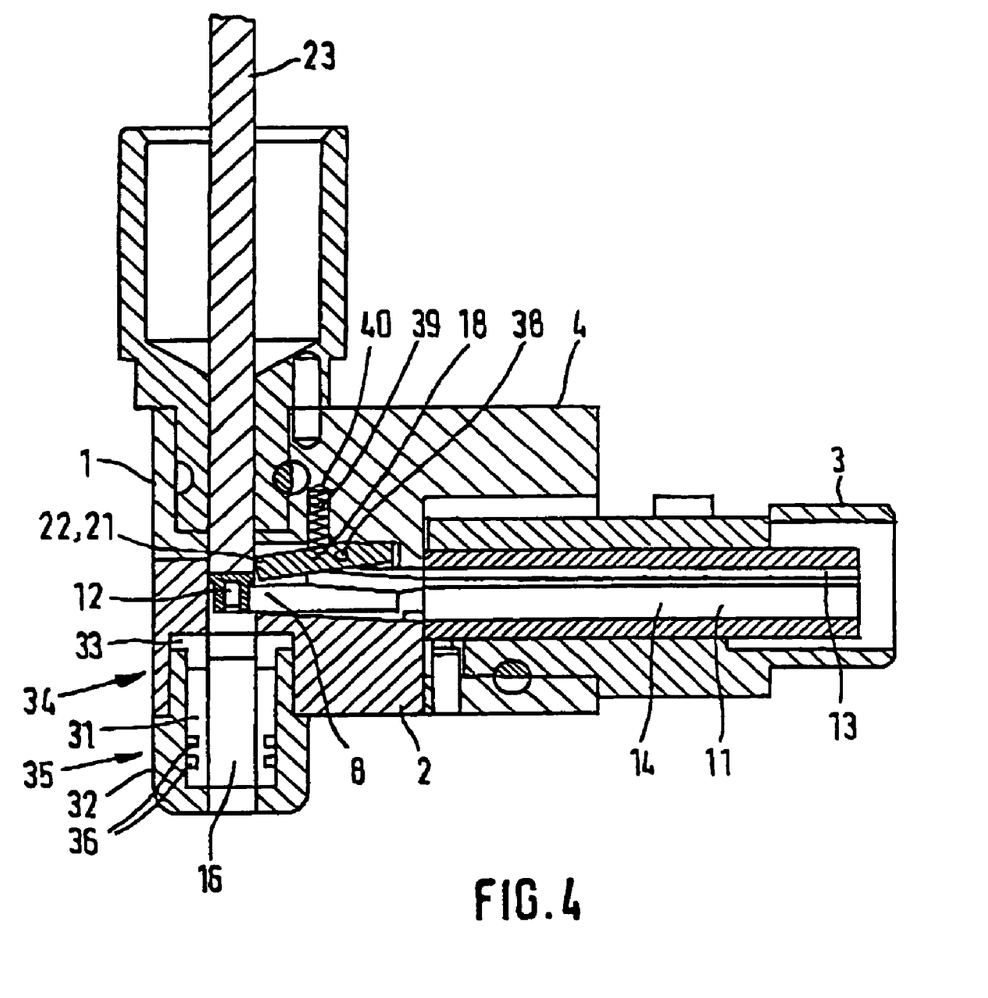
FIG. 4 shows a further embodiment of a conveyor.

We will now refer to the embodiment of a conveyor shown in FIG. 4. The basic construction of this conveyor coincides with the construction of the conveyor shown in FIGS. 1 and 3. Identical parts of the conveyors are therefore provided with identical reference numerals. The conveyor shown in FIG. 4 differs from the conveyor shown in FIGS. 1 and 3 by the design of the catch unit 17.

The catch unit 17 has a catch element 18 which is pivotal around an axis 38. A spring element 39 is a compression spring which is arranged partially in a bore 40 in the connecting member 4. The spring element 39 is substantially perpendicular to the catch element 18. The spring element is arranged between the axis 38 and the end portion 21 of the catch element 18.

If a component 12 is conveyed in the feed duct 11 to the transfer arrangement 8, the component 12 passes to the catch element 18 along which the component 12 slides. The catch element 18 which penetrates into the head guiding duct 13 is pivoted, in the path of the component 12 to the transfer region 15, by the component 12 around the axis 38 against the action of the spring element 39 out of the head guiding duct 13. The component 12 then passes into the transfer region 15. This transfer region 15 is partially limited by the locking face 22 of the catch element 18. The component 12 passes from the transfer arrangement 8 by means of the plunger 23 into the conveying duct 16.

Figure 7:
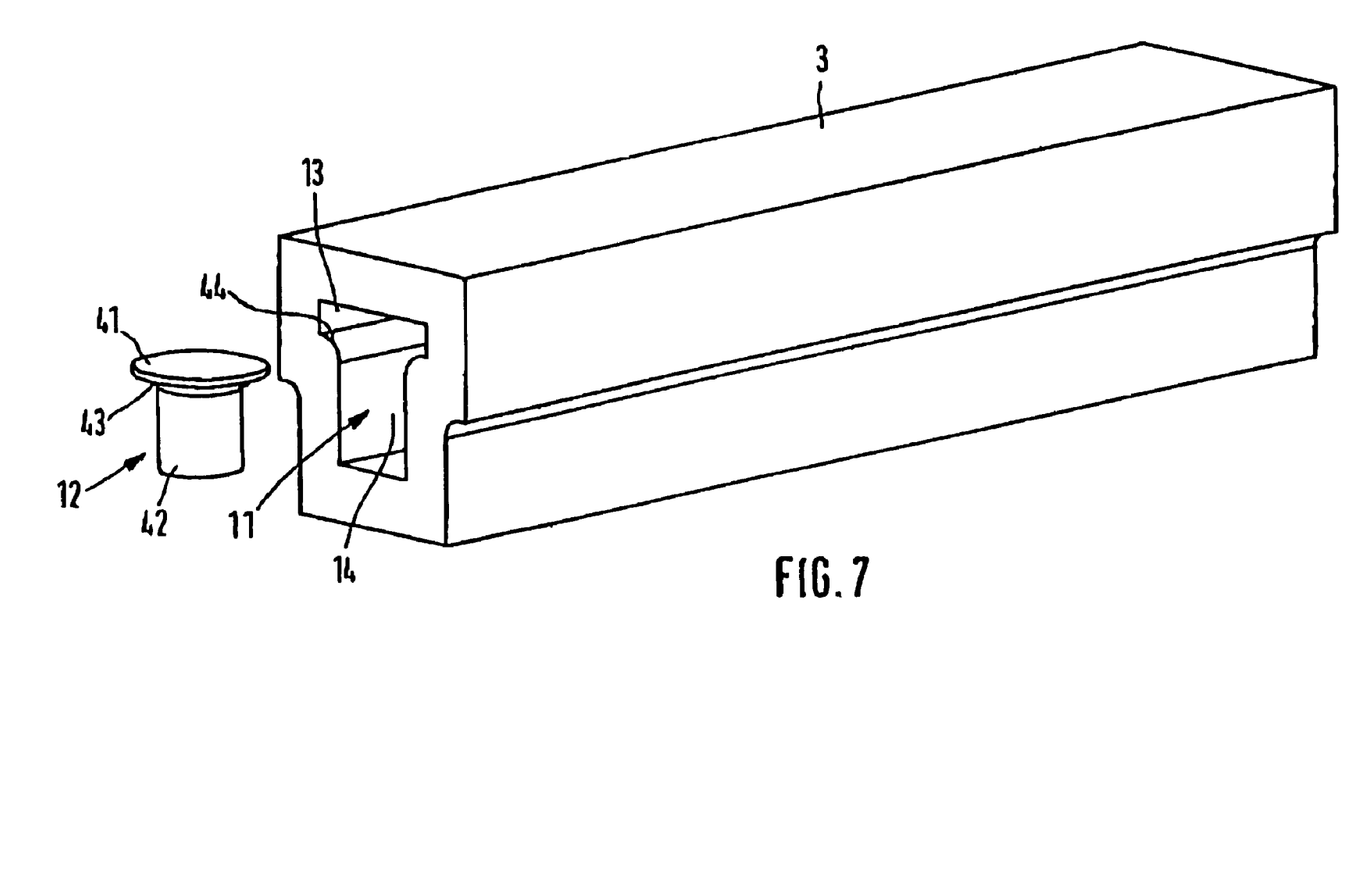
FIG. 7 is a perspective view of a feed duct with a component.

A feed conduit 3 with a conveying duct 11 is shown schematically in FIG. 7. The conveying duct 11 has a shank guiding duct 14 and a head guiding duct 13. The cross-sectional configuration of the feed duct 11 can be adapted to the component 12 which is an elongate component having a head 41 and a shank 42. During conveyance of the component 12 in the feed duct 11, the lower face 43 of the head 41 slides on the guide face 44 of the head guiding duct 13 against which the lower face 43 is pressed by the catch elements 18.

What is claimed is:

1. A method of operating a rivet machine, the method comprising:
   (a) pneumatically feeding a rivet along an elongated feeding duct, at least a section of the feeding duct having an open and substantially T-shaped cross section;
   (b) contacting an enlarged head of the rivet with an elongated element of the machine while the rivet travels along the duct;
   (c) pivoting an end of the element away from a rivet feed path in the duct to allow the rivet to pass;
   (d) locating the rivet in a position aligned with a plunger, after step (c);
   (e) moving two elongated positioning segments, located adjacent the plunger, to engage the rivet; and
   (f) advancing the plunger to drive the rivet past the positioning segments.

2. The method of claim 1 further comprising moving the rivet in a direction substantially perpendicular to a plunger-advancing direction, as the rivet moves past the element.

3. The method of claim 1 further comprising outwardly expanding a split sleeve, co-axially aligned with the plunger, as the rivet is driven through the sleeve by the plunger.

4. The method of claim 1 further comprising spring biasing the element toward the rivet feed path.

5. The method of claim 1 further comprising rotating the element about a fixed pivot pin.

6. The method of claim 1 further comprising preventing the rivet from reverse traveling up the duct by abutting the head of the rivet with an end of the element, after the rivet has moved past the element.

7. The method of claim 1 further comprising spring biasing and pivoting the positioning segments toward a central axis of the plunger.

8. The method of claim 1 wherein the rivet is a self-punching rivet including the head with is solid, and a hollow shank adjacent an open, leading end.

9. A method of rivet feeding, the method comprising:
   (a) feeding a rivet along a feeding duct;

(b) rotating a beam about a pivot pin from a feeding duct-intruding orientation to a retracted orientation;

(c) abutting an end of the beam against the rivet after the rivet has moved past the beam, to deter reverse movement of the rivet; and (d) inwardly moving segments toward each other, each segment including a rivet-engaging recess, to temporarily hold the rivet adjacent an end of the duct.

10. The method of claim 9 wherein at least a majority of each of the segments is located on a plunger-side of a line defined by a surface of the duct facing an open end of the rivet, where the duct is adjacent the segments.

11. The method of claim 9 wherein each of the segments is elongated in a direction substantially parallel with a feeding direction of the duct, adjacent the segments.

12. The method of claim 9 further comprising moving the rivet in a direction substantially perpendicular to a plunger-advancing direction, as the rivet moves past the beam.

13. The method of claim 9 further comprising:
(a) advancing a plunger to drive the rivet out of a riveting machine; and
(b) outwardly expanding a split sleeve, co-axially aligned with the plunger, as the rivet is driven through the sleeve by the plunger.

14. The method of claim 9 wherein the rivet is a self-punching rivet including a head which is solid, and a hollow shank adjacent an open, leading end.

15. A method of manufacturing using a riveting machine, the method comprising:
(a) pneumatically moving a rivet past a catch element in a direction substantially perpendicular to a plunger-advancing direction;
(b) pushing the catch element to open a movement path through contact of the rivet with the catch element;
(c) temporarily holding the rivet in rivet-receiving recesses adjacent an end of a plunger; and
(d) preventing the rivet from moving in reverse back past the catch element due to movement of the catch element to a substantially blocking position.

16. The method of claim 15 further comprising rotating elongated segments to temporarily hold the rivet adjacent the end of the plunger, each of the segments including the rivet-receiving recess.

17. The method of claim 15 further comprising:
(a) advancing a plunger to drive the rivet out of a riveting machine; and
(b) outwardly expanding a split sleeve, co-axially aligned with the plunger, as the rivet is driven through the sleeve by the plunger.

18. The method of claim 15 further comprising spring biasing the catch element toward the rivet.

19. The method of claim 15 wherein the catch element is an elongated beam which is pivotable about a fixed pivot pin.

20. The method of claim 15 wherein the catch element is a substantially L-shaped member made of a resilient material.

21. The method of claim 15 wherein the rivet is a self-punching rivet including a head which is solid, and a hollow shank adjacent an open, leading end.

22. The method of claim 15 further comprising moving the rivet through an elongated feeding duct including a substantially T-cross sectionally shaped internal passage.

23. A method of operating a rivet machine, the method comprising:
(a) feeding a self-punching rivet along an elongated feeding duct, at least a section of the feeding duct including a substantially T-shaped cross sectional internal passage;
(b) rotating a catch into the passage of the duct by a spring;
(c) contacting the rivet against the catch to control movement of the rivet;
(d) holding the rivet in a position aligned with an elongated plunger, and aligned with an adjacent end of the duct; and
(e) linearly advancing the rivet through an inwardly biased open end portion of the rivet machine, spaced away from a portion performing step (d), by movement of the plunger.

24. The method of claim 23 further comprising rotating elongated segments to temporarily hold the rivet adjacent the end of the plunger, each of the segments including a recess.

25. The method of claim 23 wherein the catch is an elongated beam which is pivotable about a fixed pivot pin.

26. The method of claim 23 further comprising moving the rivet in a direction substantially perpendicular to a plunger-advancing direction as the rivet moves past the catch.

27. The method of claim 23 wherein the catch comprises means for decelerating the self-punching rivet and the open end portion comprises sleeve means for maintaining the orientation of the self-punching rivet during advancing movement.

28. A method of riveting, the method comprising:
(a) feeding a rivet along an elongated feeding duct;
(b) inwardly rotating positioning segments toward a centerline of an elongated plunger, the segments each being elongated in a direction substantially perpendicular to the centerline;
(c) holding the rivet adjacent an end of the duct and aligned with the centerline of the plunger; and
(d) driving the rivet with the plunger after step (c).

29. The method of claim 28 further comprising moving a catch located in the duct to decelerate the rivet.

30. The method of claim 28 further comprising biasing the segments toward the centerline of the plunger.

31. The method of claim 28 further comprising holding the rivet in a recess in each of the segments.

32. The method of claim 28 wherein at least a majority of each of the segments is located on a plunger-side of a line defined by a surface of the duct facing an open end of the rivet, where the duct is adjacent the segments.

33. The method of claim 28 wherein the rivet is a self-punching rivet.

* * * * *